United States Patent
Widmer

(10) Patent No.: US 9,379,780 B2
(45) Date of Patent: Jun. 28, 2016

(54) WIRELESS ENERGY TRANSFER AND CONTINUOUS RADIO STATION SIGNAL COEXISTENCE

(75) Inventor: Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 776 days.

(21) Appl. No.: 13/324,207

(22) Filed: Dec. 13, 2011

(65) Prior Publication Data

US 2012/0153894 A1   Jun. 21, 2012

Related U.S. Application Data

(60) Provisional application No. 61/423,779, filed on Dec. 16, 2010.

(51) Int. Cl.
*H04B 5/00* (2006.01)
*B60L 11/18* (2006.01)
*H02J 5/00* (2016.01)
*H02J 17/00* (2006.01)

(52) U.S. Cl.
CPC ............ *H04B 5/0037* (2013.01); *B60L 11/182* (2013.01); *B60L 11/1838* (2013.01); *H02J 5/005* (2013.01); *H02J 17/00* (2013.01); *B60L 2200/26* (2013.01); *Y02T 10/7005* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
CPC combination set(s) only.
See application file for complete search history.

(56) References Cited

U.S. PATENT DOCUMENTS

| 8,466,654 B2 * | 6/2013 | Cook et al. ................... 320/109 |
| 2004/0041695 A1 * | 3/2004 | Reining ........................ 340/10.2 |
| 2005/0111304 A1 * | 5/2005 | Pikula et al. .................... 368/47 |
| 2005/0130601 A1 | 6/2005 | Palermo et al. |
| 2006/0211441 A1 * | 9/2006 | Mese et al. .................... 455/522 |
| 2007/0010295 A1 * | 1/2007 | Greene et al. ................ 455/572 |
| 2007/0238440 A1 * | 10/2007 | Sengupta et al. .......... 455/343.2 |
| 2008/0227478 A1 * | 9/2008 | Greene et al. ................ 455/522 |

(Continued)

FOREIGN PATENT DOCUMENTS

| CN | 1567869 A | 1/2005 |
| CN | 101300870 A | 11/2008 |
| CN | 101420186 A | 4/2009 |
| CN | 101645619 A | 2/2010 |
| CN | 101743696 A | 6/2010 |

(Continued)

OTHER PUBLICATIONS

International Search Report and Written Opinion—PCT/US2011/064838—ISA/EPO—Mar. 1, 2012.

*Primary Examiner* — Cindy Trandai
(74) *Attorney, Agent, or Firm* — Knobbe Martens Olson & Bear LLP

(57) ABSTRACT

This disclosure provides systems, methods and apparatus for wirelessly transmitting power while avoiding interference with wireless communication devices. In one aspect a wireless power transmitter apparatus is provided. The wireless power transmitter apparatus includes a transmit circuit configured to wirelessly transmit power at a transmit frequency to a first receiver device. The wireless power transmitter apparatus further includes a controller circuit configured to reduce a level of emission of the transmit circuit at a determined frequency during a period of time based on information about an information signal transmitted to a second receiver device substantially at the determined frequency to be received within the period of time.

52 Claims, 13 Drawing Sheets

(56) References Cited

U.S. PATENT DOCUMENTS

| | | |
|---|---|---|
| 2009/0281678 A1 | 11/2009 | Wakamatsu |
| 2010/0068996 A1 | 3/2010 | Haartsen |
| 2010/0142423 A1* | 6/2010 | Zhu et al. .................. 370/311 |
| 2010/0148723 A1* | 6/2010 | Cook et al. ................. 320/108 |
| 2010/0151808 A1* | 6/2010 | Toncich et al. ........... 455/226.3 |
| 2010/0181961 A1 | 7/2010 | Novak et al. |
| 2011/0049997 A1* | 3/2011 | Urano ......................... 307/104 |
| 2011/0127951 A1* | 6/2011 | Walley et al. ............... 320/108 |
| 2011/0264035 A1* | 10/2011 | Yodfat et al. .................. 604/66 |
| 2011/0274221 A1* | 11/2011 | Yang ....................... H04B 1/10 375/344 |

FOREIGN PATENT DOCUMENTS

| | | |
|---|---|---|
| EP | 2325037 A1 | 5/2011 |
| JP | 2009278707 A | 11/2009 |
| JP | 2010068632 A | 3/2010 |
| JP | 2010112782 A | 5/2010 |
| JP | 2010243193 A | 10/2010 |
| JP | 2012518382 A | 8/2012 |
| WO | WO 2008051611 A2 | 5/2008 |
| WO | WO 2010006078 | 1/2010 |
| WO | WO-2010060062 A1 | 5/2010 |
| WO | WO-2010093997 A1 | 8/2010 |

* cited by examiner

US 9,379,780 B2

WIRELESS ENERGY TRANSFER AND CONTINUOUS RADIO STATION SIGNAL COEXISTENCE

CROSS REFERENCE TO RELATED APPLICATIONS

This application claims priority under 35 U.S.C. §119(e) to U.S. Provisional Patent Application No. 61/423,779 entitled "WIRELESS ENERGY TRANSFER AND CONTINUOUS RADIO STATION SIGNAL COEXISTENCE" filed on Dec. 16, 2010, the disclosure of which is hereby incorporated by reference in its entirety.

FIELD

The present invention relates generally to wireless power transfer, and more specifically to devices, systems, and methods related to wireless power transfer to remote systems such as vehicles including batteries.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Once aspect of the disclosure provides a wireless power transmitter apparatus. The wireless power transmitter apparatus includes a transmit circuit configured to wirelessly transmit power at a transmit frequency to a first receiver device. The wireless power transmitter apparatus further includes a controller circuit configured to reduce a level of emission of the transmit circuit at a determined frequency during a period of time based on information about an information signal transmitted to a second receiver device substantially at the determined frequency to be received within the period of time.

Another aspect of the disclosure provides an implementation of a method for wirelessly transmitting power while avoiding interference with information signal transmission. The method includes wirelessly transmitting power at a transmit frequency to a first receiver device. The method further includes reducing a level of emission of wireless power transmission to the first receiver device at a determined frequency during a period of time based on information about an information signal transmitted to a second receiver device to be received within the period of time.

Yet another aspect of the disclosure provides a wireless power transmitter apparatus. The wireless power transmitter apparatus includes means for wirelessly transmitting power at a transmit frequency to a first means for receiving. The wireless power transmitter apparatus includes means for controlling configured to reduce a level of emission generated by the means for wirelessly transmitting at a determined frequency during a period of time based on information about an information signal transmitted to a second means for receiving to be received within the period of time.

Figure 1:
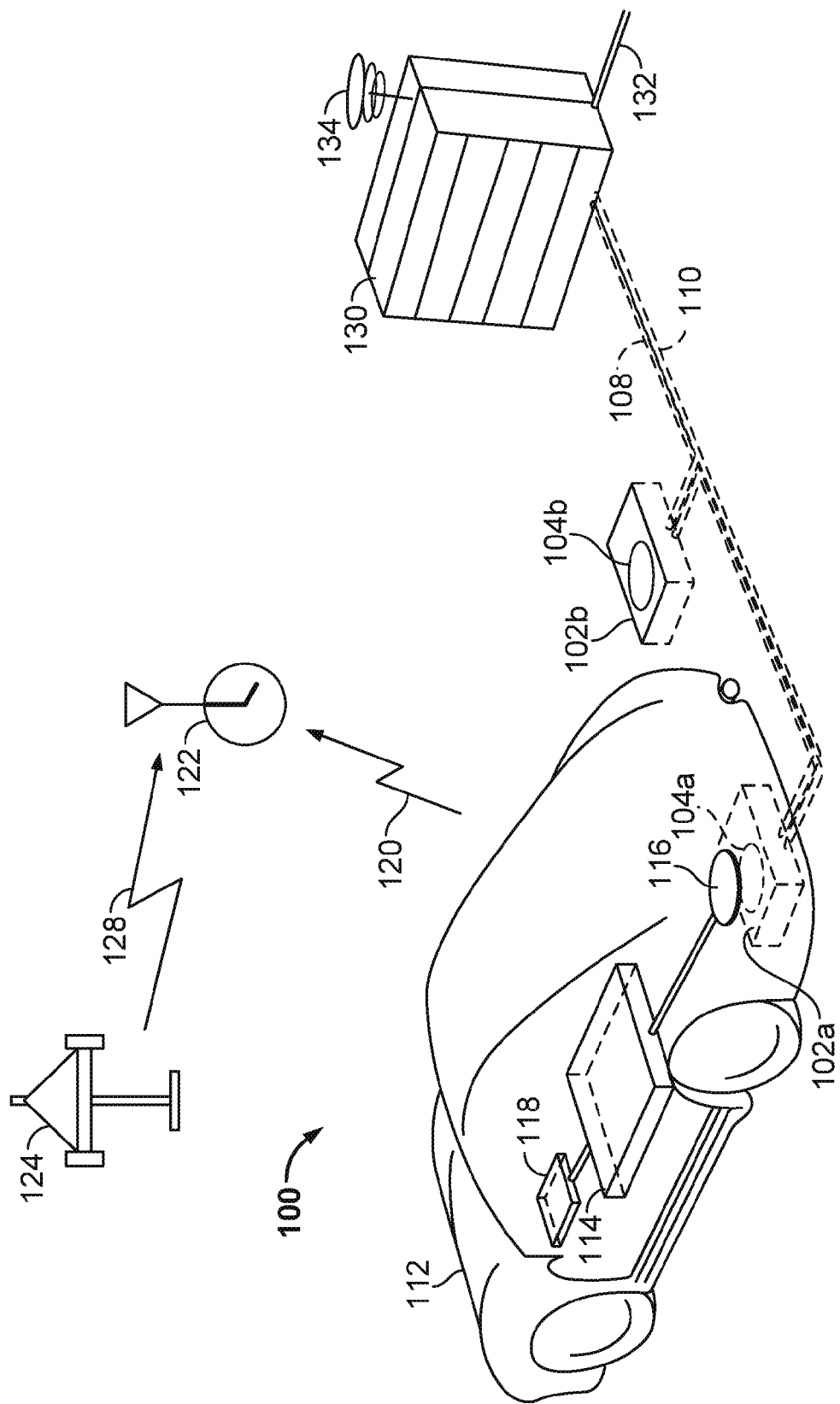
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space via a wireless field). The power output as a wireless field (e.g., a magnetic field) may be received or captured by a "receiving coil" to achieve power transfer. The amount of power transferred may be sufficient enough to power or charge a device. The wirelessly received power may be provided to one or more electrochemical cells or systems including electrochemical cells for the purpose of recharging the electrochemical cells.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking areas to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102 a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Additional sensitive receiving devices may be positioned within the vicinity of a wireless power transfer system 100. These receiving devices may receive information signals wirelessly. For example, a radio controlled clock 122 may be located in or in close proximity to an electric vehicle 112. As will be further described below, the radio controlled clock 122 may receive time data updates from a radio broadcast station 124 via a wireless communication link 128. In some cases emissions produced by the wireless power transfer system 100 may interfere with information signal transmissions to third party electronic devices such as a radio controlled clock 122.

Figure 2:
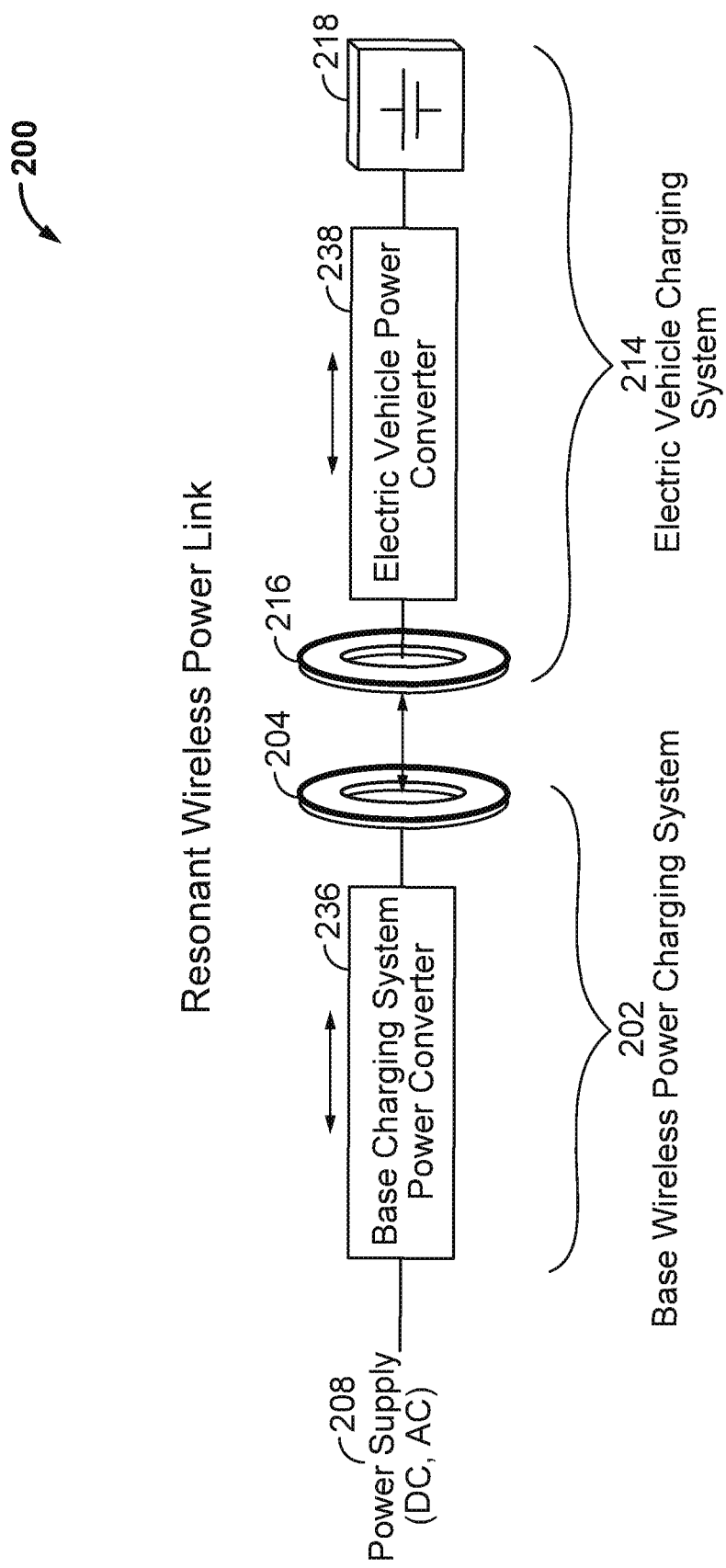
FIG. 2 is a functional block diagram of exemplary core components of the wireless power transfer system of FIG. 1.

FIG. 2 is a functional block diagram of exemplary core components of the wireless power transfer system of FIG. 1. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 drives the base system induction coil 204 to emit an electromagnetic field at a desired frequency.

The base system induction coil 204 and electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle induction coil 116 and extracted in an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

In operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112.

In some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204). Inductance may generally be the inductance of the induction coil, whereas, capacitance is generally added to the induction coil to create a resonant structure at a desired resonant frequency. As a non limiting example, a capacitor may be added in series with the induction coil to create a resonant circuit that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
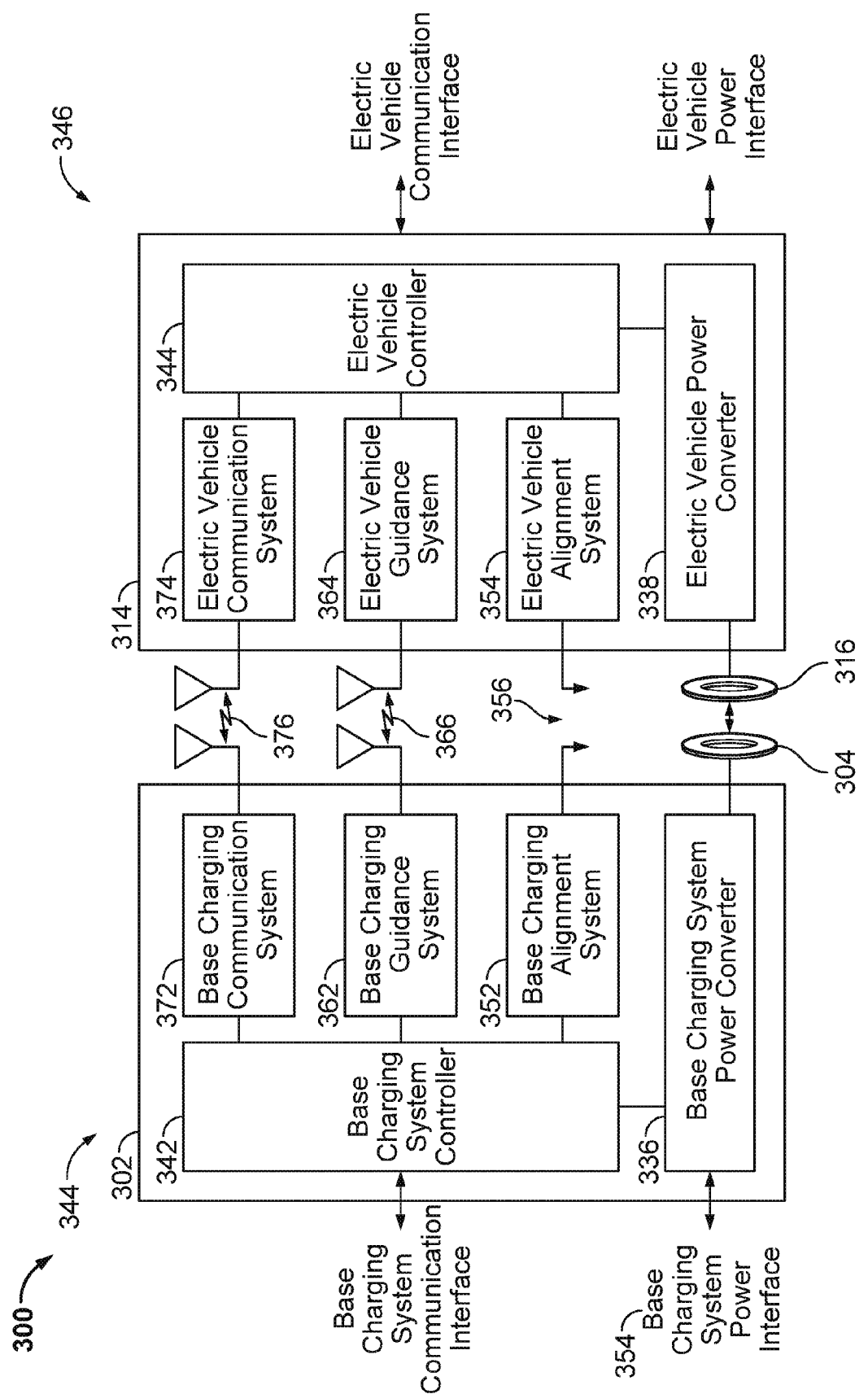
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
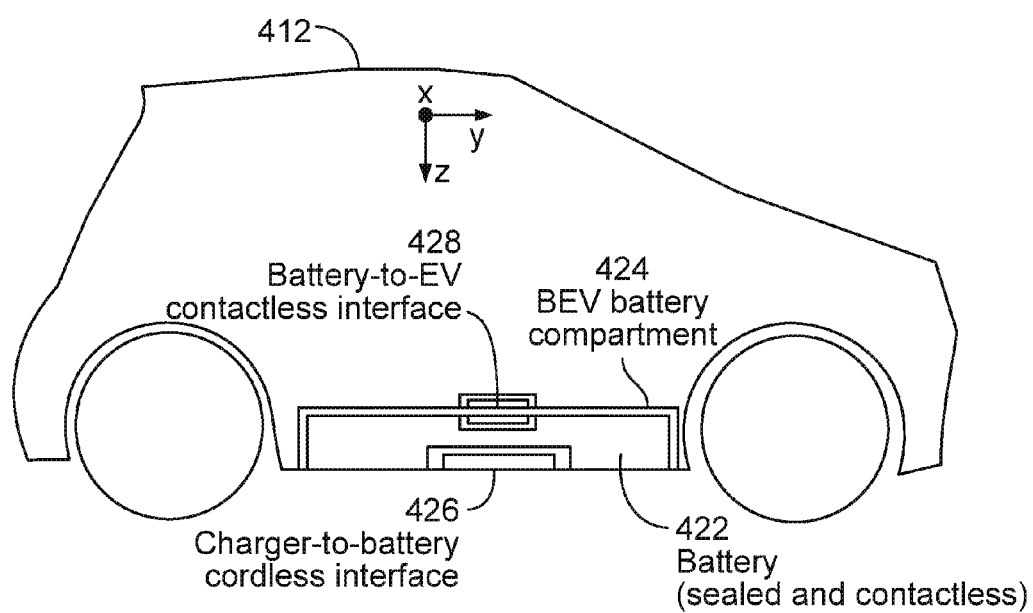
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
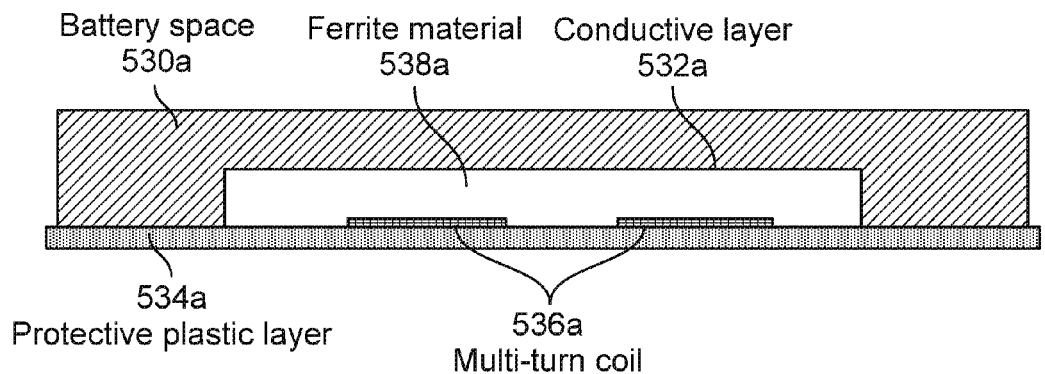
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
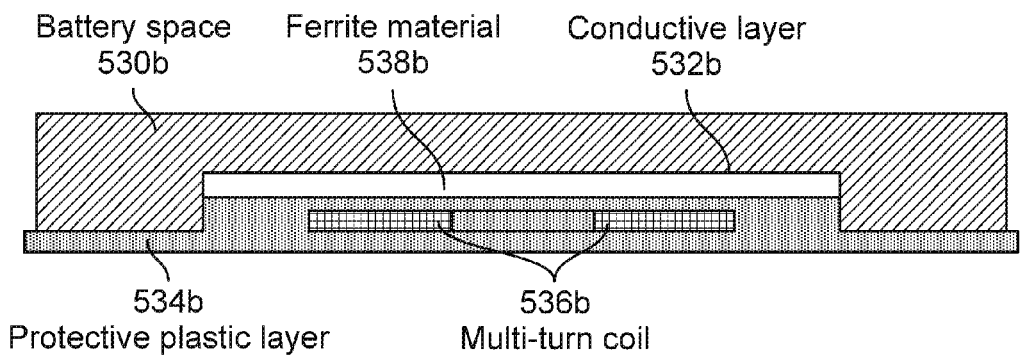

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
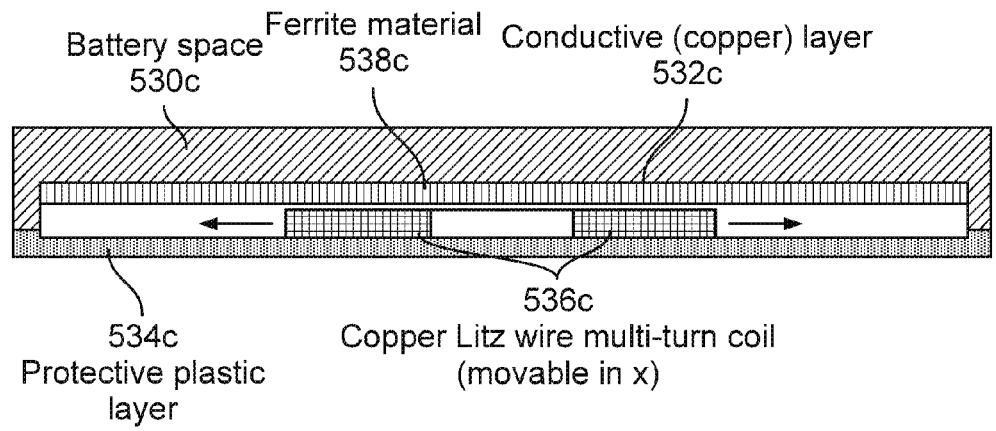
Figure 5D:
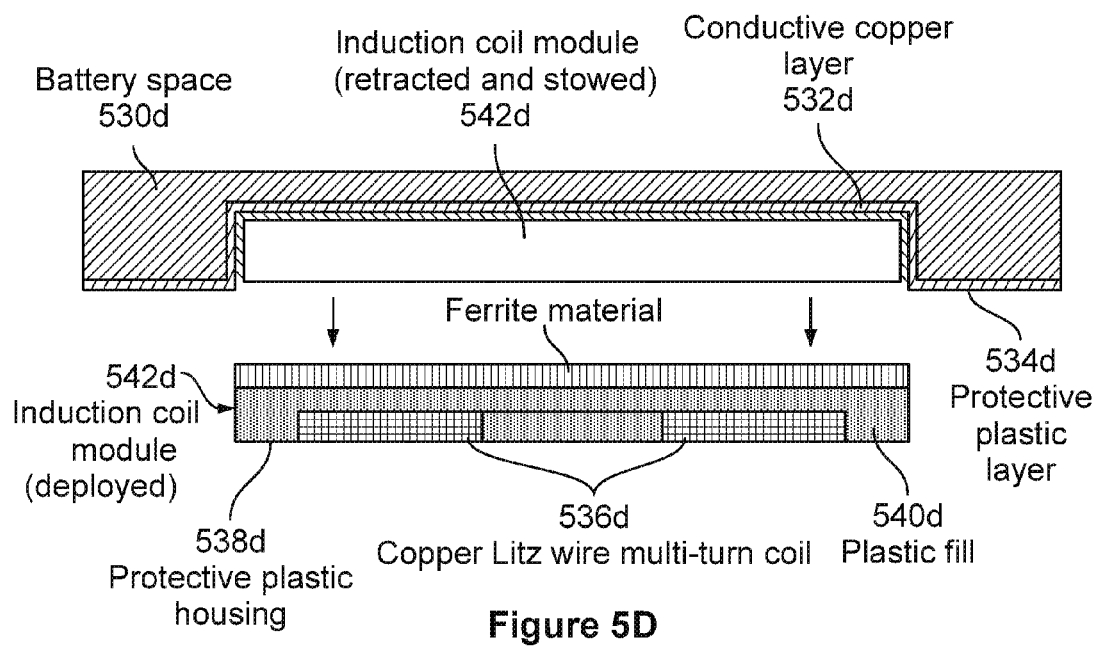

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 533d may be used to protect the conductive shield 532d, the coil 536d, and the ferrite material 5d38 from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
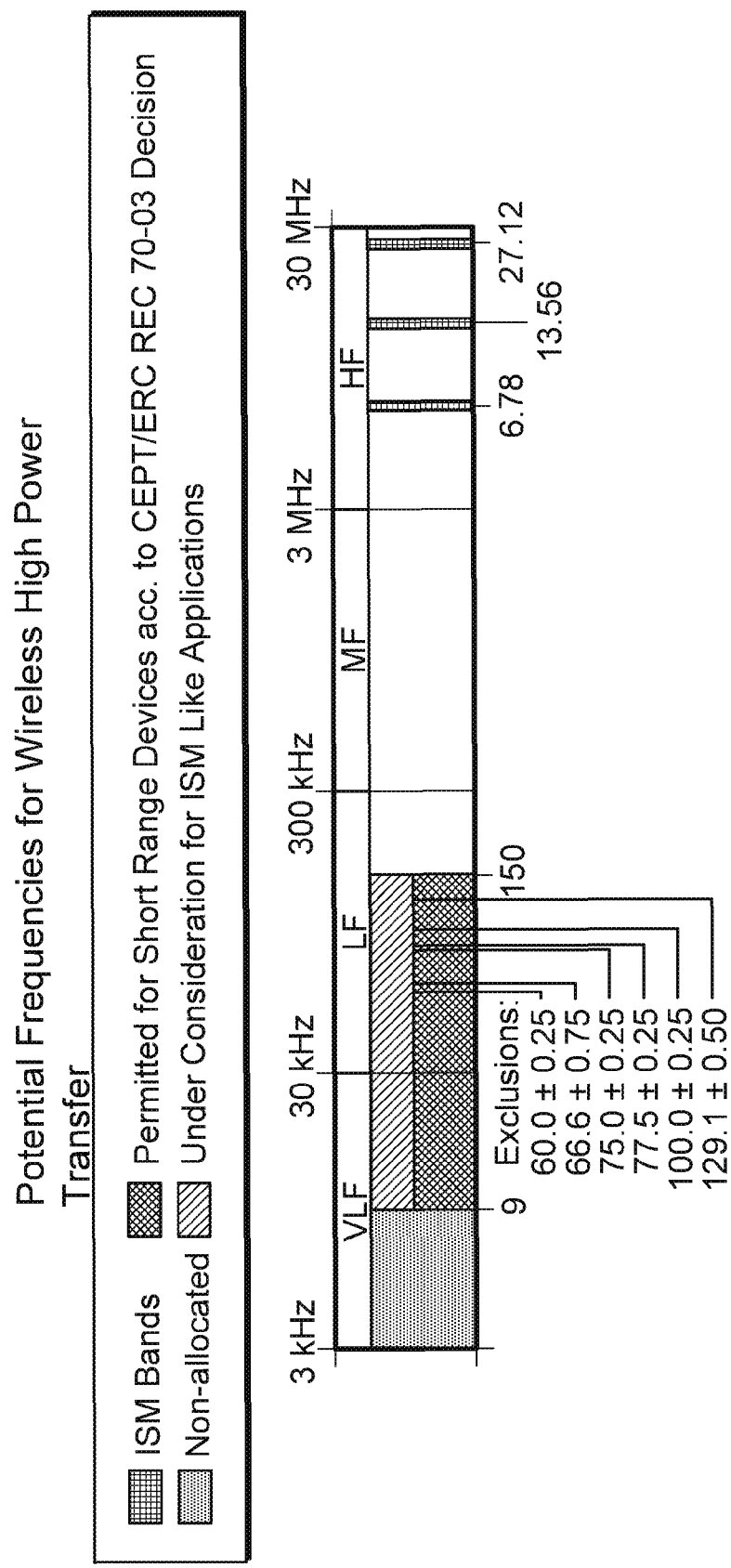
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
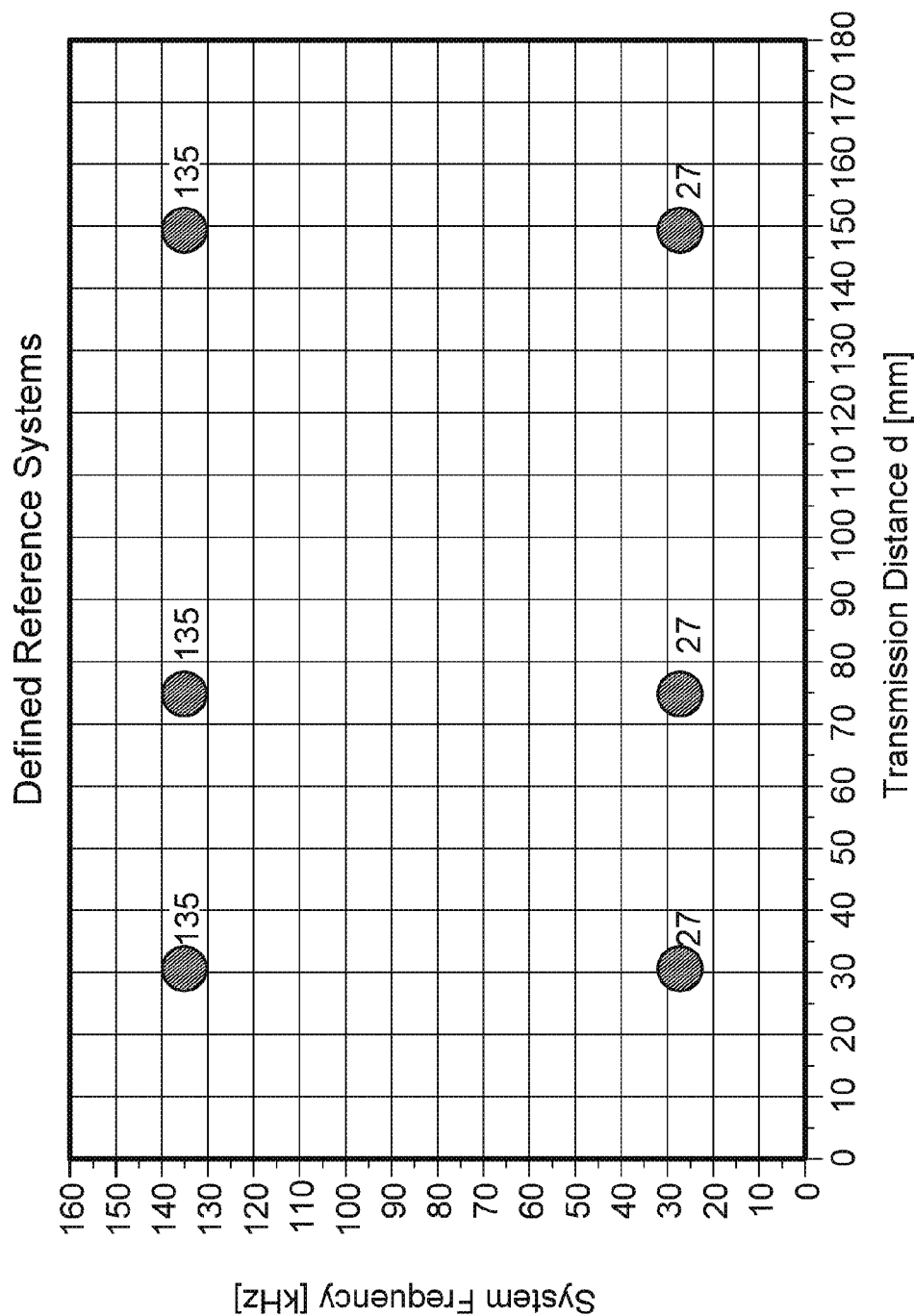
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

Many considerations may be taken into account when determining a suitable frequency for a wireless power transfer system 100. For example, resonance characteristics and the coupling-mode region of the receive and transmit induction coils may be factors when choosing a suitable frequency. In addition, wireless power frequencies may interfere with frequencies used for other applications. As non-limiting examples, there may be VLF/LF coexistence issues with power line frequencies, audible frequencies and communication frequencies. Non-limiting examples where coexistence may be an issue for VLF and LF are: frequencies for a radio controlled clock 122, frequencies for long wave AM broadcasts and other radio services, cross-coupling to ISDN/ADSL and ISDN/xDSL communication channels, electronic vehicle immobilization systems, RFID (Radio Frequency Identification) systems, EAS (Electronic Article Surveillance) systems, on-site paging, Low Voltage PLC systems, medical implants (cardiac pacemakers, etc.), audio systems, and acoustic emission perceivable by humans and animals. Long wave AM broadcasts may use a frequency range between 149 kHz and 284 kHz and may be broadcast from high power transmitters to mobile and fixed receivers in a range of less than five hundred kilometers.

Furthermore, non-limiting examples where coexistence may be an issue for HF (high frequencies) are industrial, scientific and medical (ISM) radio bands, such as: 6.78 MHz for remote control applications and RFID in full duplex (FDX) or half duplex (HDX) mode with continuous energy transfer; 13.56 MHz for RFID in FDX or HDX mode with continuous energy transfer as well as portable device wireless power; and 27.12 MHz for railway applications (e.g., Eurobalise 27.095 MHz), citizen band radio, and remote control (e.g., models, toys, garage door, computer mouse, etc.).

A base wireless charging system 102a and its controller 342 may be configured to control various aspects of power conversion including regulating a duty cycle for selectively adjusting the base charging system power converter 336 to generate magnetic near field for wireless power transmission. The base charging system controller 342 may also either reduce or suspend generation of the magnetic near field during a wireless power transmission pause interval or adjust an operating frequency. The transmission pause interval may result in a suspension of generation of any jamming signals that may inhibit, for example, a wireless communication device such as a radio controlled clock 122 from receiving a desired radio station signal. Furthermore, during a vehicle to grid configuration, the electric vehicle controller 344 may similarly regulate a duty cycle for selectively adjusting the electric vehicle power converter to generate magnetic near field for wireless power transmission and either reduce or suspend generation of the magnetic near field during a wireless power transmission pause interval or adjust an operating frequency.

In some exemplary embodiments, a frequency in the range from 20-60 kHz may provide various benefits for achieving highly efficient power conversion using solid state devices.

Furthermore, this frequency range may have less coexistence issues with radio systems as compared to other frequency bands. However, when coexistence of wireless power transmission band and other radio systems cannot be accomplished merely by non-overlapping frequency selection, exemplary embodiments provide for respectful cooperative operating options. For example, a radio controlled clock 122 receiving time signals at LF frequency, for example DCF77 in Europe or WWVB in North America, may be a potential victim of a high power wireless energy transfer system 100 operating at VLF or LF. Depending on selection of an operating frequency and coexistence scenario, the receiver of a radio station signal such as a radio controlled clock 122 may be inhibited by receipt of a jamming signal (e.g., wireless power) including a fundamental or by any harmonic frequencies of the wireless power transmission band.

In one exemplary embodiment, time signals received from LF radio stations may provide a local time reference with high long term accuracy. Short term accuracy may be difficult to achieve since signal bandwidth is very low. Signal to noise ratios may also be low depending on distance of the receiver from the transmitter. Transmission delay may vary to some extent depending on propagation mode (ground wave or ionospheric sky wave or mixed reception). As opposed to GPS navigation signals in L-Band that may be used as time reference, LF signals may penetrate more easily into buildings and homes, usually not requiring outdoor antennas. They may even be received underground if wave path is not obstructed by electric conducting materials (e.g., iron reinforced concrete). Moreover, these long waves may be easily received by low complexity, low cost, and miniaturized receivers using a small ferrite rod antenna.

Signal reception at LF may be frequently affected by high atmospheric noise levels in summer time and fading (mutual interference of ground wave with sky wave) mainly during night time. Signal reception at LF may also be affected by other local interference requiring a radio controlled clock 122 to rely on a time base (crystal) over extended periods of time. LF radio controlled clocks have found wide acceptance and time signals are broadcast in several countries (e.g., see Table 1 below). For example, it is estimated that in Europe about 100 Million receivers tuned to DCF77 in Germany have been sold in the years from 2000-2008. In fact, DCF77 is one of the major means to disseminate the 'legal time' realized for Germany by the 'Physikalisch Technische Bundesanstalt' in Braunschweig.

TABLE 1

Time Signal Radio Stations Transmitting at LF

| Frequency | Call Sign | Country | Location | Radiated Power |
|---|---|---|---|---|
| 40 kHz | JJY | Japan | Ohtakadoyayama | 12.5 kW |
| 60 kHz | GBZ | UK | Anthorn | 17 kW |
| | JJY | Japan | Haganeyama | 22.5 kW |
| | WWVB | USA | Colorado Springs | 65 kW |
| 66.66 kHz | RBU | Russia | Elektrougli, Moscow | 10 kW |
| 68.5 kHz | BPC | China | Pucheng | 20 kW |
| 75 kHz | HBG | Switzerland | Prangins | 25 kW |
| 77.5 kHz | DCF77 | Germany | Mainflingen | 30 kW |
| 162 kHz | TDF | France | Allouis | 2000 kW |

Radio clocks using WWVB receiving devices may be found in North America. These clocks may include desktop, wall-mounted, and wrist watch type radio controlled clocks.

Figure 8:
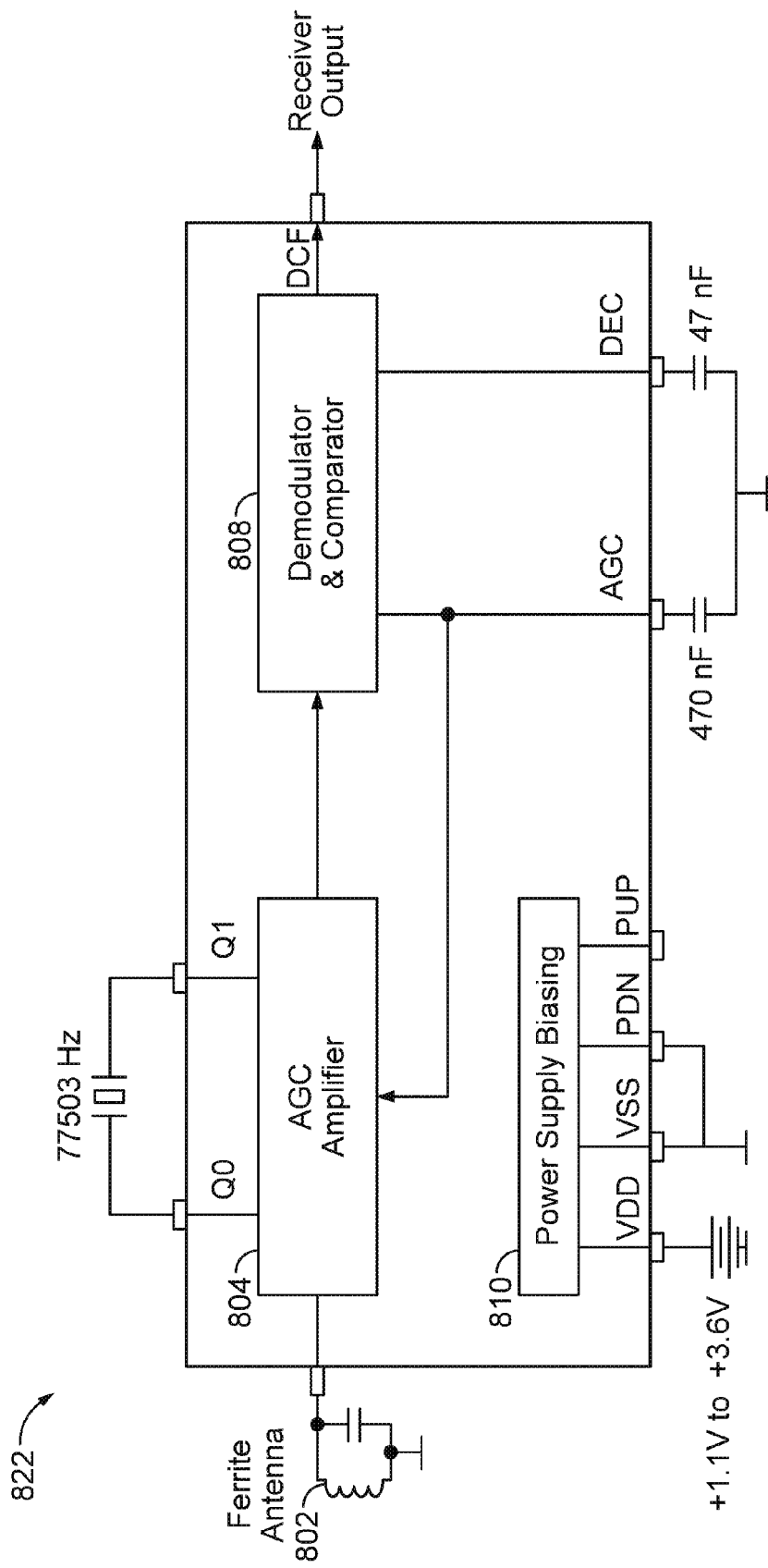
FIG. 8 is a schematic diagram of an exemplary radio controlled clock receiver.

FIG. 8 is a schematic diagram of an exemplary radio controlled clock receiver 822. Depending on size and surrounding materials impacting Q-factor, a ferrite antenna 802 may serve as pre-selection filter narrowing receiver input bandwidth down to a target frequency such as 1 kHz typically. The radio controlled clock 822 may include an automatic gain control (AGC) amplifier 804, a demodulator and comparator 808, and power supply biasing circuitry 810. Principal selectivity may be provided through a 10 Hz crystal filter inserted after a preamplifier stage. This high-Q filter may be centered at receive carrier frequency. There may be no need for frequency conversion using an intermediate frequency as receive frequency may be low enough and also fixed, thus allowing direct amplification at receive frequency. Though highly selective, strong interference signals close to the receiving band may block the receiver either by saturating the pre-amplification or by the limited out-of-band attenuation of the crystal filter.

The radio station signal received by the radio controlled clock 822 may have a varying field strength. The field strength may be dependent on several design constraints. In one aspect, it may be beneficial to provide a minimum field strength of 55 dBµV/m (560 µV/m) outdoors, corresponding to a distance of 1000 km in the case of a DCF77 transmitter. Additionally, a minimum signal-to-noise ratio of 10 dB may be needed to synchronize to the received time signal. Furthermore, the radio controlled clock 822 receiver may have a bandwidth of 10 Hz. Also, an additional margin of 20 dB may be needed to account for non-optimum antenna orientation (e.g., where the receiver is randomly oriented) and indoor penetration loss. Given these exemplary conditions, the strength of a magnetic field output by the base system induction coil 104a may be designed not to exceed, for example:

$$H = 55 \text{ dB}\mu\text{V/m} - 52 \text{ dB}(\Omega) - 10 \text{ dB} - 20 \text{ dB} = -27 \text{ dB}\mu\text{A/m}$$

where H is the magnetic field strength of the field output by the base system induction coil 104a. This may ensure that the magnetic field strength H avoids interfering with the radio station signal to be received by the radio controlled clock 822 under the field strength conditions for the radio controlled clock 822 described above. This exemplary magnetic field strength level of the base wireless charging system 102a may be fairly low in regards to expected unwanted emissions of an electric vehicle wireless charging system.

The level interference generated by a wireless charging system signal output is also related to the distance from the base system induction coil 104a. A distance relationship for magnetic fields generated from an electrically small antenna/coil (Radius r<<wavelength λ) may be 60 dB per decade in the near field. At frequencies of 77.5 kHz, the near field extends to a radius of approximately:

$$r_{near\_field} = \frac{\lambda}{2\pi} = \frac{c_0}{2\pi f} \approx 616 \text{ m}$$

Where $c_0$ is the speed of light. Radio controlled clock synchronization may be configured to be resilient to temporary signal outages as clocks may typically provide enough free run accuracy to bridge extended periods of signal absence. Moreover, a time code may be repeated every minute and intelligent clocks may use transmitted parity bits and redundancy inherent to calendar/date information to retrieve or recover the time information from the signal. As such, there may be a high amount of redundancy that may be exploited by an intelligent receiver. For example, a few interference free minute per day may be sufficient to fully synchronize a radio controlled clock.

However, interference may still create significant problems. For example, when the battery of a radio controlled clock 122 is replaced, a complete clock resynchronization and time information acquisition and time signal may be required. Interference may cause problems when the radio signal to the radio controlled clock 822 is unavailable for an extended period of time. Furthermore, additional situations may occur when the time is changed from a normal time to daylight savings time or vice versa and time signal is unavailable for an extended period of time (e.g., more than one hour). Such conditions may result in missed appointments or other time sensitive situations due to inaccurate time. In addition, high reliability is expected for clocks in public buildings and master clocks employed to provide accurate time information to computer network servers.

Figure 9A:
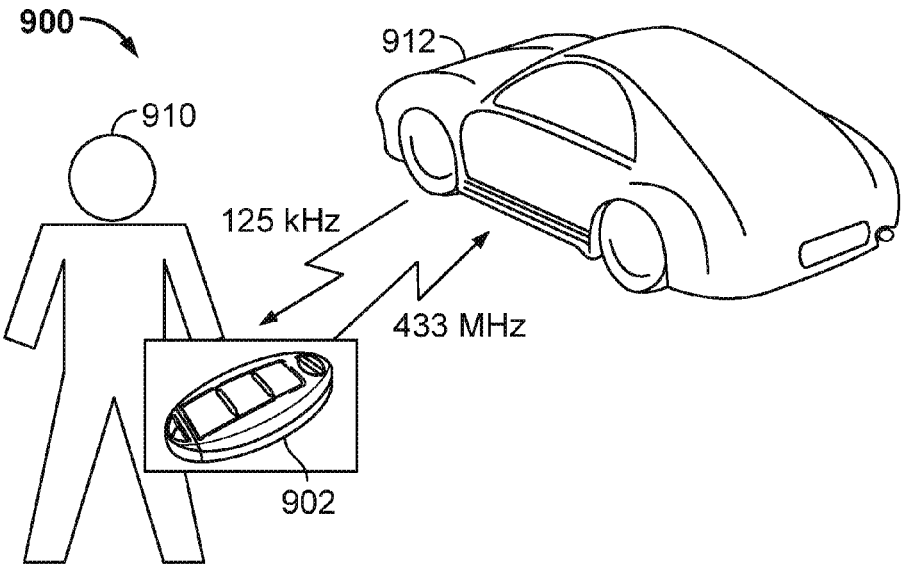
FIG. 9A is a diagram of an exemplary automobile keyless entry system.

A radio controlled clock 822 is just one example of a device that could potentially experience interface from a wireless power transfer system 100. In the context of an electric vehicle 112, another example of a coexistence system might be a keyless automobile entry system. FIG. 9A is a diagram of an exemplary automobile keyless entry system 900. The keyless entry system 900 may include smart key systems (low frequency/ultra high frequency (LF/UHF)) that use low frequency for close proximity coupling (contactless). Keyless entry systems (LF/UHF) are also used that use low frequency for vicinity coupling (<0.5 m). Interference may be product of collocation with electric vehicle charging and radiated harmonics. A vehicle operator 910 may carry a transponder device 902 (e.g., a fob or other small electronic device) that may be used to automatically and wirelessly send control signals to lock/unlock an electric vehicle 912 or perform other functions such as starting the engine. The transponder device 902 may include input mechanisms (e.g., buttons) for performing various functions such as unlocking or locking the electric vehicle 912. The transponder device 902 may also automatically trigger functions in the electric vehicle if the transponder device 902 comes within a certain region surrounding the electric vehicle. The system 900 may use a combination of LF and UHF. For example the transponder device 902 may communicate with a vehicle at 433 MHz, while the vehicle may communicate with the transponder device 902 at low frequencies such as 125 kHz.

Figure 9B:
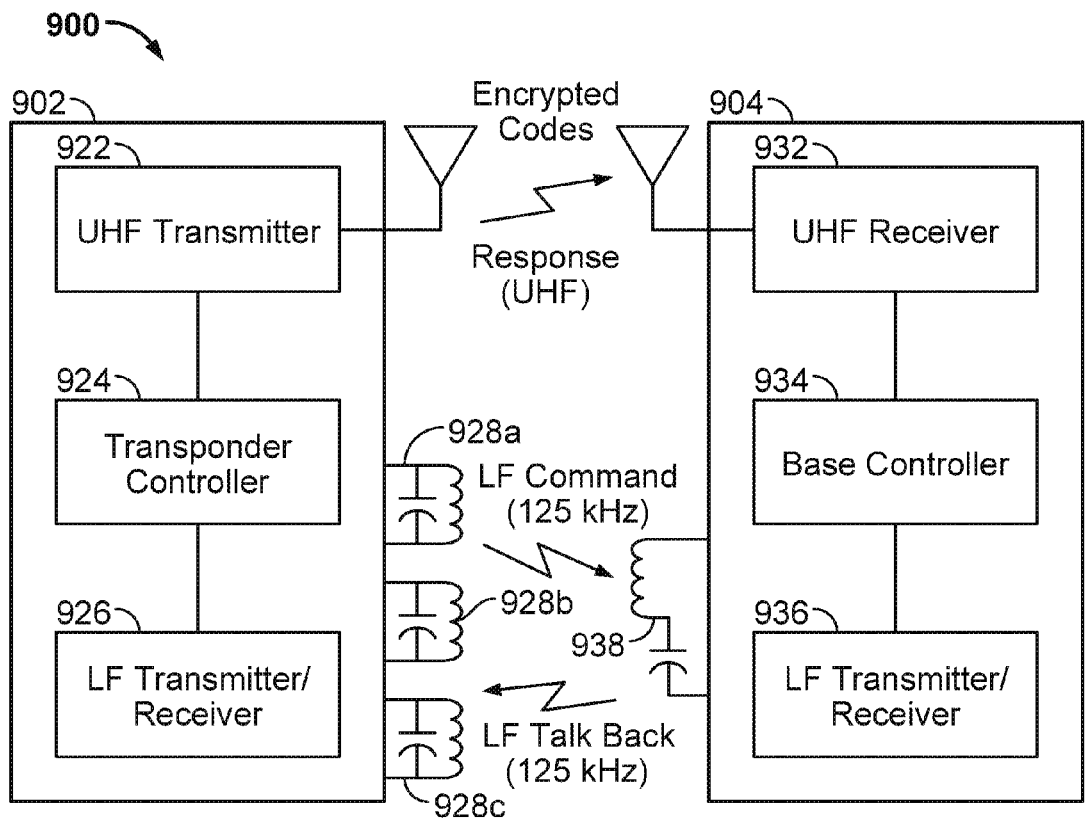
FIG. 9B is a functional block diagram of an exemplary automobile keyless entry system as shown in FIG. 9A.

FIG. 9B is a functional block diagram of an exemplary automobile keyless entry system as shown in FIG. 9A. The keyless entry system 900 may include a transponder 902 that includes a UHF transmitter 922. The UFH transmitter 922 may be used to send encrypted codes at high frequencies such as 433 MHz for authenticating the transponder 902 with a keyless entry base station 904. The transponder further includes a LF transmitter/receiver 926 (i.e., transceiver). The transmitter/receiver 926 may use multiple antennas 928a, 928b, and 928c to transmit and receive commands from a base station 904. The LF transmitter/receiver 926 may send LF commands to and receive information from the base station 904 of the keyless entry system. Signals may be transmitted at 125 kHz. The transponder 902 may further include a controller 924 for controlling various operations of the transponder 902.

The keyless entry system 900 further includes a keyless entry system base station 904. The base station 904 includes a UHF receiver 932 that may receive encrypted codes from the UHF transmitter 922 in the transponder 902. The base station 904 further includes a LF Transmitter/Receiver 936 that may transmit and receive low frequency communications via a base station antenna 938. Signals may be transmitted at 125 kHz. The base station 904 further includes a base controller 934 for controlling various operations of the base station 904. A wireless power transfer system 100 may potentially cause interference with these systems as the signals may be transmitted at frequencies close to or used by the wireless power transfer system 100 proximately to an electric vehicle 912 being wirelessly charged.

According to one aspect of exemplary embodiments, an operating frequency of an wireless power transfer system 100 may be chosen so that fundamental or any harmonics do not interfere with other communication signals, such as any of the broadcast station signals such as time signal broadcast frequencies listed in Table 1. In this case, interference may have minimal impact (e.g., through the use very narrow crystal filters (e.g., 10 Hz) in a radio controlled clock 822). However, interference may occur even if there was no frequency coincidence because of (1) limited out-of-band attenuation of 10 Hz crystal filters of radio controlled clock receiver 822, (2) noise sidebands of the emissions of high power transfer caused by jitter in drive waveforms of power conversion, or (3) modulation sidebands in case power transfer was modulated e.g., by the AC supply frequency (power conversion from unfiltered DC to LF).

Accordingly, one aspect of certain embodiments may include to avoid essential emissions in a wider (guard) band around the center of a radio signal frequency (e.g., +/−2 kHz from the carrier frequency) in order to sufficiently protect time signal reception. If a wireless power transfer system 100 relies on a fixed frequency, then neither fundamental nor harmonic frequencies should fall into a guard band of a data signal broadcast frequency to a remote device such as a radio controlled clock 822.

If the wireless power transfer system 100 relies on a variable operating frequency, for example for power control, neither the fundamental of the frequency nor harmonics of the frequency used for energy transfer at nominal power level (which is most of the time) should fall into a guard band of a time signal broadcast frequency according to various exemplary embodiments. Furthermore, the use of any other frequency, for example to throttle power, may be limited in time during a transmission pause interval to allow, for example, a radio controlled clock 822 to synchronize from time to time. In one embodiment, the range from 42 to 50 kHz may be considered a useful choice for the fundamental operating frequency of the wireless power transfer system 100 in regards to coexistence with a radio controlled clock receiver 822.

Additionally, if above measures do not provide sufficient protection, certain aspects of exemplary embodiments are directed to pausing power transmission for a few minutes during a transmission pause interval (e.g., during the night), to allow, for example, a radio controlled clock 822 to resynchronize and to change to daylight saving time, or to capture the leap-second, etc. This may be performed by a programmable clock as part of the base charging system controller 342 in the electric vehicle controller 346 unit.

In certain coexistence scenarios, interference may be caused by more than one base wireless charging system 102a and 102b, for example in a parking garage. Accordingly, in another exemplary embodiment, a common silence period, such as a common transmission pause interval controlled by the utility or the grid operator, may be introduced at operator defined times. In these transmission pause intervals, power transfer of multiple wireless charging systems in a certain area may be either reduced or switched off completely. In such an embodiment, each base wireless charging system 102a may be individually and remotely managed by the grid operator, for example, to reduce or switch off power transfer.

Interference issues with professional time receiving sites (e.g., for computer network synchronization) requiring time signals to be received more frequently and with higher quality and perhaps with a larger bandwidth, may require a more robust scheme. In another exemplary embodiment, a grid operator may manage a number of wireless charging systems 102a, 102b to control their power output levels and overcome other specific interference scenarios. Interference mitigation by smartly managing wireless charging systems 102a, 102b by the grid operator and in response to an interference complaint may apply to any radio receiving or non-radio receiving system that is a potential victim of emissions emanating from wireless charging of electric vehicles.

Figure 10:
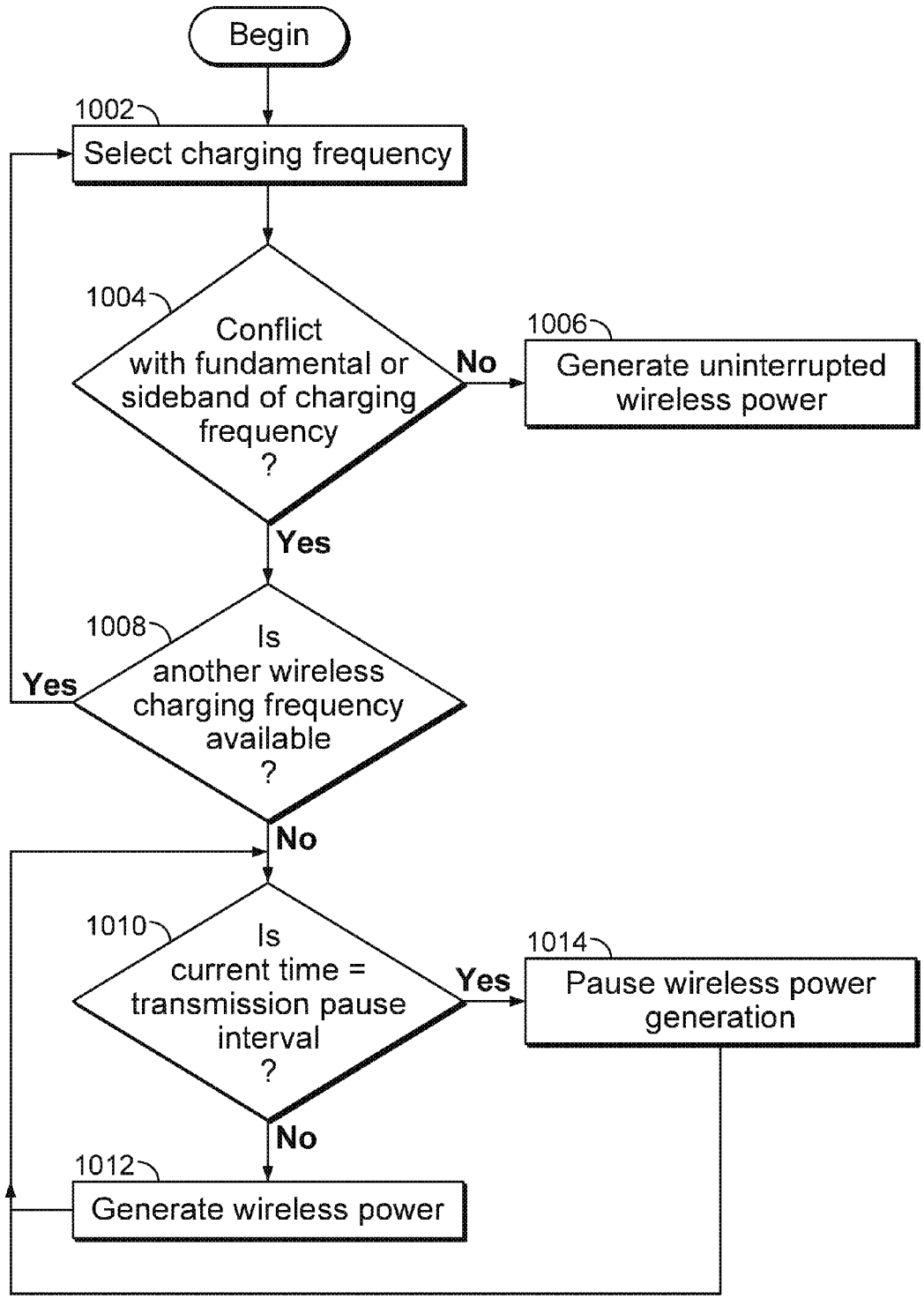
FIG. 10 is a flowchart of an exemplary method for wirelessly charging an electric vehicle in the presence of remote wireless communication devices that may potentially experience interference from a wireless power charging system, in accordance with an exemplary embodiment of the invention.

FIG. 10 is a flowchart of an exemplary method for wirelessly charging an electric vehicle in the presence of remote wireless communication devices that may potentially experience interference from a wireless power charging system 102a, in accordance with an exemplary embodiment of the invention. In block 1002, a base wireless charging system 102a may select a charging frequency. In decision block 1004, the base wireless charging system 102a determines whether the selected frequency, sideband of the frequency, or harmonic of the selected frequency may potentially conflict with another wireless signal (e.g., intended for some third party device apart from the wireless power transfer system 100). If there is no conflict (e.g., the selected wireless power transmission frequency does not interfere with known deployments of radio station receivers (e.g., radio controlled clocks) or that any fundamental, sidebands, or guard bands of the wireless power transmission frequency does not overlap with a radio station signal), then the wireless power charging system 102a may wirelessly generate uninterrupted power.

If a fundamental, harmonic, sideband, or guard band frequency of the wireless power transmission signal overlaps or would otherwise interfere with another wireless signal, then the base wireless charging system 102a may determine if another non-interfering wireless power transmission frequency is available in decision block 1008. If another frequency is available, then the base wireless charging system 102a may reselect the wireless power transmission frequency and the method may begin again in block 1002.

If there is no other wireless charging frequency available that would avoid interference, then coexistence methods using overlapping or otherwise interfering signals may be necessary. As such, the base wireless charging system 102a may generate a wireless power transmission cycle with a duty cycle including a wireless power transmission interval and a transmission pause interval. As described above, the wireless power transmission cycle may be programmed into the base charging system controller 342 or may be externally mandated by a grid operator. As such, in decision block 1010, the base wireless charging system 102a may determine whether a current time value is equal to a transmission pause interval. If the current time is not equal to the transmission pause interval then the base wireless charging system 102a may generate wireless power until the time is checked at another time as shown in block 1012. If the current time is equal to the transmission pause interval, then the base wireless charging system 102a may pause wireless power generation.

It should be appreciated that while the method described above with reference to FIG. 10 describes the use of a base wireless charging system 102a, an electric vehicle charging system 114 may additionally carry out one or more of the operations described in FIG. 10, particularly if the electric vehicle charging system 114 is wirelessly transferring power to the base wireless charging system 102a.

Figure 11:
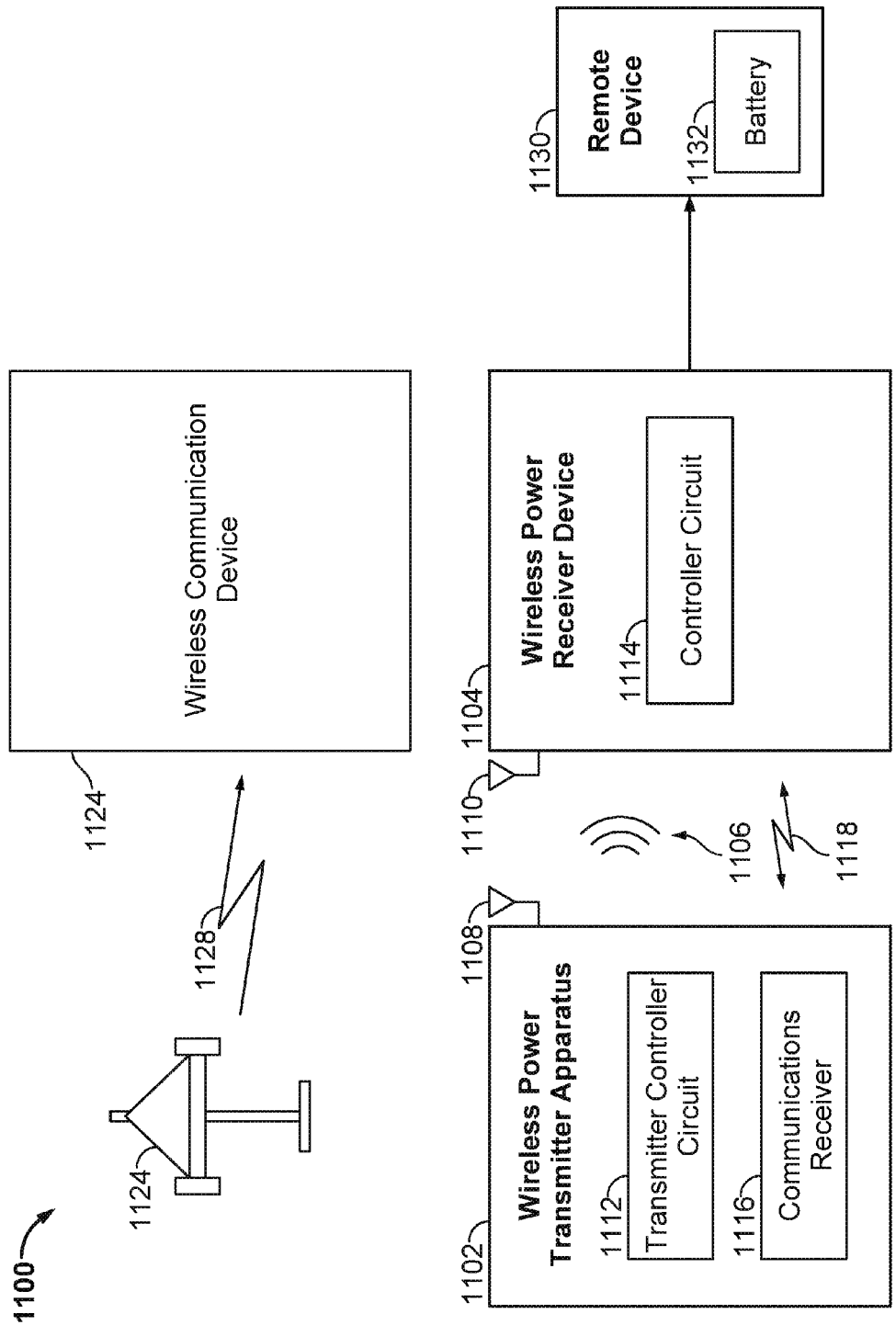
FIG. 11 is a functional block diagram of an exemplary wireless power charging system configured to prevent interference between a wireless power transmitter and remote wireless communication device, in accordance with an exemplary embodiment of the invention.

In accordance with the principles described herein, one embodiment therefore provides a wireless power transfer system 100 that is configured to cooperatively coexist with other wireless communication devices or any other device associated with a potentially interfering wireless signal. FIG. 11 is a functional block diagram of an exemplary wireless power charging system 1100 configured to prevent interference between a wireless power transmitter 1102 and a remote wireless communication device 1124, in accordance with an exemplary embodiment of the invention. The wireless power charging system includes a wireless power transmitter apparatus 1102. In one embodiment, the wireless power transmitter apparatus 1102 may be the base wireless charging system 102a as shown in FIGS. 1-3. In another embodiment, the wireless power transmitter apparatus 1102 may be the electric vehicle charging system 114 as shown in FIGS. 1-3.

The wireless power transmitter apparatus 1102 includes a transmit circuit 1108 that may include a transmit induction coil that is configured to wirelessly transmit power at a transmit frequency to a wireless power receiver device 1104 (i.e., a first receiver device) via a wireless field 1106 as described above with reference to FIGS. 1-3. In some embodiments, the frequency may be within a range of 10 kHz to 150 kHz. The transmit frequency may correspond to a resonant frequency of the transmit circuit 1108. The wireless power receiver device 1104 may be configured to wirelessly receive power via a receive circuit 1110 that may include a receive induction coil. The receive circuit 1110 may be configured to resonate at the transmit frequency. The wireless power receiver device 1104 may further include components such as those described with reference to FIG. 3. The wireless power receiver device may be configured to provide the wirelessly received power to charge or power a remote device 1130. For example, the remote device may be an electric vehicle 112 including a battery 1132 that may be charged.

The wireless power transmitter apparatus 1102 further includes a controller circuit 1112 (e.g., the base charging system controller 342) that is configured to reduce a level of emission of the transmit circuit 1108 at a determined frequency (e.g., the transmit frequency, a harmonic, or some sideband) for a period of time. The period of time may be based on information about information signals transmitted to a wireless communication device 1124 (i.e., second receiver device) to be received during the time period. The wireless communication device 1124 may an external device not associated with the wireless power transmitter apparatus 1102 (e.g., would not receive power from or routinely communicate with the wireless power transmitter apparatus 1102 for purposes other than interference avoidance). For example, the second receiver device may by a third party wireless communication device 1124 that may be located in proximity to the wireless power transmitter apparatus 1102. As described above, examples of wireless communication devices may include a radio controlled clock 122 or a vehicle keyless entry system 900. The wireless communication device 1124 may communicate via RF signals and receive communications from a base station 1124. The wireless communication device 1124 may communicate using frequencies close to or substantially the same as frequencies used by the wireless power transmitter apparatus 1124. It should be appreciated that embodiments are not limited to a wireless communication device 1124. Principles described herein may apply to a number of remote devices that produce or are associated with wireless energy output.

The controller circuit 1112 may be configured to reduce a level of emission in many ways. For example the strength of the electromagnetic field 1106 output by the transmit circuit 1108 at a particular determined frequency may be reduced. In another embodiment, the wireless power transmitter apparatus 1102 is disabled or wireless transmission is paused. In another embodiment, the controller circuit 1112 may be configured to reduce the strength of the field 1106 to approximately 10% of its full strength. In another embodiment, the controller circuit 1112 may be configured to adjust the operational frequency away from an interfering frequency (e.g., at one frequency the strength of the field 1106 is reduced, but at another frequency the strength of the field 1106 is increased). The wireless power transmitter apparatus 1202 may further include a power converter circuit (not shown) as described above with reference to FIGS. 1-3. The controller circuit 1112 may be configured to adjust the power converter in response to the period of time (e.g., transmission pause interval)

The reduction in emissions may be temporary and performed periodically. The period of time may correspond to a transmission pause interval. For example, in some embodiments, time signals may be transmitted by a radio broadcast station 124 to a radio controlled clock 112 every minute. For a radio controlled clock 122, the reduction in wireless power transfer could be done for a few seconds every minute. In other embodiments (for example if the radio controlled clock 122 only needs to be updated once a day) the reduction in wireless power transfer may happen at a scheduled time once daily, or any other periodic time interval per information regarding the wireless communication. In this case, if the radio controlled clock 122, for example, may be able to receive a time transmission every minute, the reduction in the level of output power may be greater than a minute to ensure the radio controlled clock 122 receives the communication (e.g., sufficient for a cycle of the radio station signal). As such, the controller 1102 may be configured to selectively adjust the AC output power in response to the pause interval.

The controller circuit 1112 may be configured to reduce the output power level at the frequency in response to information that the frequency of information signals to the wireless communication device 1124 is at the same frequency of wireless power transmission, in a sideband of the wireless power transmit frequency, or a harmonic of the wireless power transmit frequency. For example, the wireless power transmit frequency that may potentially cause interference may include one of 40 kHz, 60 kHz, 66.66 kHz, 68.5 kHz, 75 kHz, 77.5 kHz and 162 kHz. The transmit frequency may further be in a range of about 20 kHz to 60 kHz. The transmit frequency could also be in a range of about 42 kHz to 50 kHz.

The wireless power transmitter apparatus 1102 may also include a communications receiver 1116. The communications receiver 1116 may be configured to receive commands from a communications transmitter. The commands may include information regarding the period of time to reduce a level of output power. For example, the commands may indicate when output power should be reduced, for how much time, and by how much. Furthermore, the command may include a frequency that the wireless power transmitter may use. The command may be sent via the power grid or operator of the wireless power transmitter apparatus. The commands for reducing interference may come from the wireless communication device 1124. The commands may also be information regarding a potential interference scenario. In this case, the wireless power transmitter apparatus 1102 may respond accordingly as it sees necessary to operate to reduce interference based on the information. The wireless power transmitter apparatus 1102 may further store a schedule or other information that indicates periods for reducing power levels to avoid interference with wireless communications the wireless communication device 1124. As such, the wireless power transmitter apparatus 1102 may be configured to reduce power output to avoid interference between the power output and the data communication to the wireless communication device 1124. The wireless transmitter apparatus 110s may therefore implement active interference avoidance mechanisms that may allow wireless power systems to operate at increased emission levels.

Figure 12:
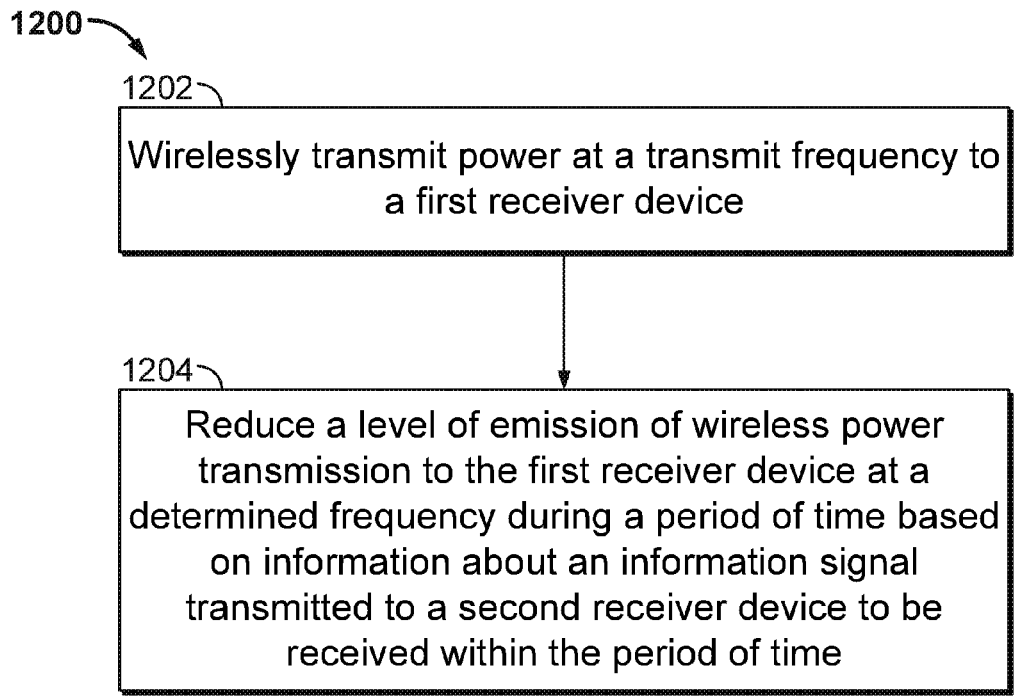
FIG. 12 is a flowchart of an exemplary method for preventing interference between wireless power transmitter apparatus and a remote wireless communication device, in accordance with an exemplary embodiment of the invention.

FIG. 12 is a flowchart of an exemplary method for preventing interference between wireless power transmitter apparatus 1102 and a remote wireless communication device 1124, in accordance with an exemplary embodiment of the invention. In block 1202 a wireless power transmitter apparatus 1102 may wirelessly transmit power at a transmit frequency to a first receiver device (e.g., a wireless power receiver device 1104). The first receiver device may be an electric vehicle charging system 114. In block 1204, wireless power transmitter apparatus 1102 may reduce a level of emission of wireless power transmission to the first receiver device 1104 at a determined frequency during a period of time based on information about an information signal transmitted to a second receiver device (e.g., a wireless communication device 1124) to be received during the period of time. The second receiver device may be external to the wireless power transmitter apparatus 1102. The second receiver device may be a remote or third party device not associated with a wireless power system 100. The second receiver device may be a radio controlled clock 122 as described above. The second receiver device may also be any other electronic device that may receive radio signals and may experience interference from a signal used for wireless power transfer. It should be further appreciated that, as described above, the electric vehicle charging system 114 may act as a wireless power transmitter. As such, the electric vehicle charging system 114 may carry out the operations in blocks 1202 and 1204.

Figure 13:
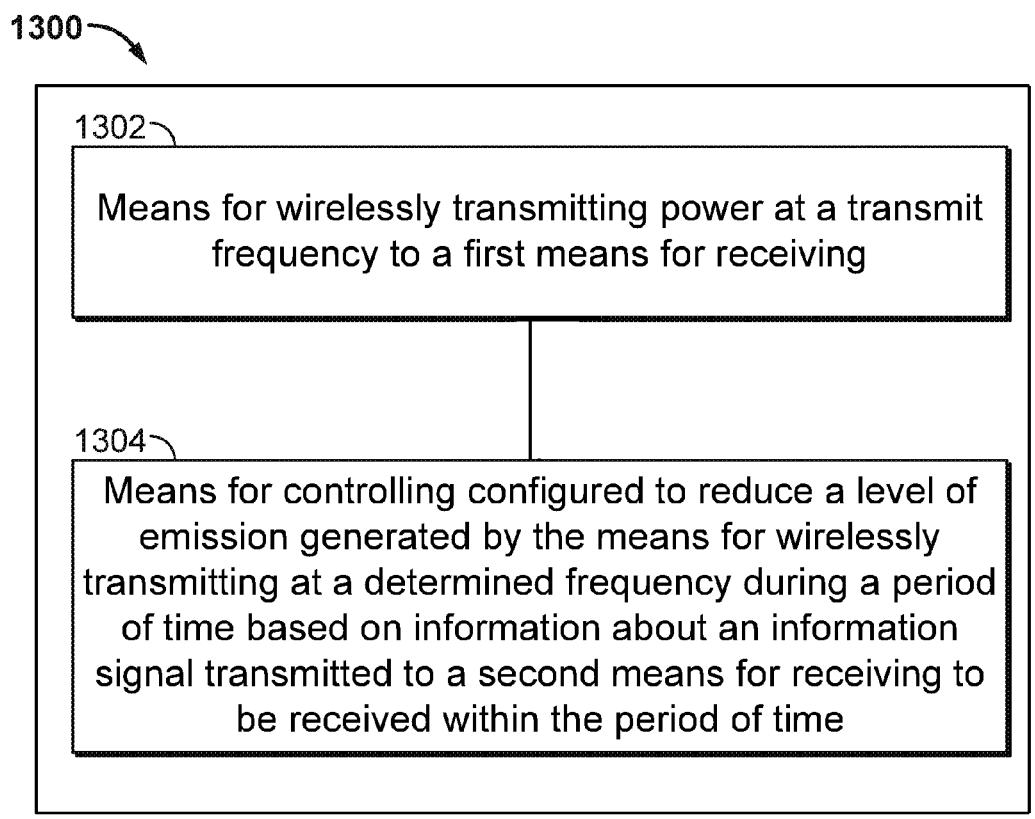
FIG. 13 is a functional block diagram of a wireless power transmitter, in accordance with an exemplary embodiment of the invention.

FIG. 13 is a functional block diagram of a transmitter, in accordance with an exemplary embodiment of the invention. Device 1300 comprises means 1302 and 1304 for the various actions discussed with respect to FIGS. 1-12.

The various operations of methods described above may be performed by any suitable means capable of performing the operations, such as various hardware and/or software component(s), circuits, and/or module(s). Generally, any operations illustrated in FIGS. 1-13 may be performed by corresponding functional means capable of performing the operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that may be accessed by a computer. By way of example, and not limitation, such computer readable media may comprise RAM, ROM, EEPROM, CD ROM or other optical disk storage, magnetic disk storage or other magnetic storage devices, or any other medium that may be used to carry or store desired program code in the form of instructions or data structures and that may be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless power transmitter apparatus, the apparatus comprising:
   a transmit circuit configured to wirelessly transmit power at a transmit frequency to a first receiver device; and
   a controller circuit configured to adjust the transmit frequency from a first frequency to a second frequency in response to information indicating interference with an information signal transmitted to a second receiver device at a third frequency, the second frequency being different from the first frequency and the third frequency.

2. The wireless power transmitter apparatus of claim 1, wherein the first frequency is substantially within a bandwidth of frequencies that may interfere with the information signal.

3. The wireless power transmitter apparatus of claim 1, wherein the controller circuit is further configured to reduce a level of emission of the transmit circuit to avoid interfering with the transmitted information signal.

4. The wireless power transmitter apparatus of claim 1, further comprising a receiver circuit configured to receive a command from a communications transmitter, wherein the command comprises information indicating a transmission period of time of the information signal.

5. The wireless power transmitter apparatus of claim 4, wherein second receiver device comprises the communications transmitter.

6. The wireless power transmitter apparatus of claim 4, wherein the period of time is determined by a schedule of information signal transmissions to the second receiver device.

7. The wireless power transmitter apparatus of claim 4, wherein the controller circuit is further configured to disable the transmit circuit during the period of time.

8. The wireless power transmitter apparatus of claim 4, wherein the period of time is greater than one minute.

9. The wireless power transmitter apparatus of claim 4, wherein the controller circuit is further configured to adjust the transmit frequency of the transmit circuit from the first frequency to the second frequency during the period of time.

10. The wireless power transmitter apparatus of claim 9, wherein a periodicity of adjusting the transmit frequency is at least once a day.

11. The wireless power transmitter apparatus of claim 1, wherein the controller circuit is further configured to reduce a level of wireless power transmission.

12. The wireless power transmitter apparatus of claim 1, wherein the second receiver device comprises a radio controlled clock.

13. The wireless power transmitter apparatus of claim 1, wherein the transmit frequency is within a range of 10 kHz to 150 kHz.

14. The wireless power transmitter apparatus of claim 1, wherein the first receiver device is configured to charge or power a battery of an electric vehicle.

15. The wireless power transmitter apparatus of claim 1, wherein the first receiver device is configured to feed power back to a power distribution network.

16. The wireless power transmitter apparatus of claim 1, wherein the third frequency is one of a fundamental frequency, a harmonic frequency, a sideband frequency, or a guard band frequency of the first frequency.

17. A method for wirelessly transmitting power while avoiding interference with information signal transmissions, the method comprising;
   wirelessly transmitting power at a transmit frequency from a transmit circuit to a first receiver device; and
   adjusting the transmit frequency from a first frequency to a second frequency in response to information indicating interference with an information signal transmitted to a second receiver device at a third frequency, the second frequency being different than the first frequency and the third frequency.

18. The method of claim 17, wherein the first frequency is substantially within a bandwidth of frequencies that may interfere with the information signal.

19. The method of claim 17, further comprising reducing a level of emission of wireless power transmission to the first receiver device to avoid interfering with the information signal.

20. The method of claim 17, further comprising receiving a command from a communications transmitter, wherein the command comprises information indicating a transmission period of time of the information signal.

21. The method of claim 20, wherein the second receiver device comprises the communications transmitter.

22. The method of claim 20, wherein the period of time is determined by a schedule of information signal transmissions to the second receiver device.

23. The method of claim 20, further comprising reducing a level of wireless power transmission during the period of time.

24. The method of claim 20, further comprising disabling a transmit circuit used to wirelessly output power during the period of time.

25. The method of claim 20, wherein the period of time is greater than one minute.

26. The method of claim 20, wherein adjusting the transmit frequency comprises adjusting the transmit frequency from the first frequency to the second frequency during the period of time.

27. The method of claim 26, wherein adjusting the transmit frequency comprises adjusting the transmit frequency from the first frequency to the second frequency at least once a day.

28. The method of claim 17, wherein adjusting the transmit frequency comprises adjusting the transmit frequency from the first frequency to the second frequency in response to information indicating an operating frequency of the second receiver device.

29. The method of claim 17, wherein the second receiver device comprises a radio controlled clock.

30. The method of claim 17, wherein the transmit frequency is within a range of 10 kHz to 150 kHz.

31. The method of claim 17, wherein the first receiver device is configured to charge or power a battery of an electric vehicle.

32. The method of claim 17, wherein the first receiver device is configured to feed power back into the power distribution network.

33. The method of claim 17, wherein the third frequency is one of a fundamental frequency, a harmonic frequency, a sideband frequency, or a guard band frequency of the first frequency.

34. A wireless power transmitter apparatus, the apparatus comprising:
    means for wirelessly transmitting power at a transmit frequency to a first receiver device; and
    means for adjusting the transmit frequency from a first frequency to a second frequency in response to information indicating interference with an information signal transmitted to a second receiver device at a third frequency, the second frequency being different from the first frequency and the third frequency.

35. The wireless power transmitter apparatus of claim 34, wherein the first frequency is substantially within a bandwidth of frequencies that may interfere with the second means for receiving.

36. The wireless power transmitter apparatus of claim 34, further comprising means for reducing a level of emission generated by the power transmitting means to avoid interfering with the transmission of the information signal.

37. The wireless power transmitter apparatus of claim 34, further comprising means for receiving a command from a communications transmitter, wherein the command comprises information indicating a transmission period of time of the information signal.

38. The wireless power transmitter apparatus of claim 37, wherein the second receiver device comprises the communications transmitter.

39. The wireless power transmitter apparatus of claim 37, wherein the period of time is determined by a schedule of information signal transmissions to the second receiver device.

40. The wireless power transmitter apparatus of claim 37, further comprising means for disabling the means for wirelessly transmitting power during the period of time.

41. The wireless power transmitter apparatus of claim 37, wherein the period of time is greater than one minute.

42. The wireless power transmitter apparatus of claim 34, further comprising means for reducing a level of wireless power transmission of the power transmitting means.

43. The wireless power transmitter apparatus of claim 42, wherein the reducing means is further configured to reduce the level of wireless power transmission during the period of time.

44. The wireless power transmitter apparatus of claim 43, wherein a periodicity of reducing the level of wireless power transmission is at least once a day.

45. The wireless power transmitter apparatus of claim 34, wherein the adjusting means is configured to adjust the transmit frequency from the first frequency to the second frequency in response to information indicating an operating frequency of the second receiver device.

46. The wireless power transmitter apparatus of claim 34, wherein the second receiver device comprises a radio controlled clock.

47. The wireless power transmitter apparatus of claim 34, wherein the transmit frequency is within a range of 10 kHz to 150 kHz.

48. The wireless power transmitter apparatus of claim 34, wherein the first receiver device is configured to charge or power a battery of an electric vehicle.

49. The wireless power transmitter apparatus of claim 34, wherein the first receiver device is configured to feed power back into a power distribution network.

50. The wireless power transmitter apparatus of claim 34, wherein the means for wirelessly transmitting power comprises a transmit circuit comprising a transmit coil, and wherein the first receiver device comprises a receive circuit comprising a receive coil.

51. The wireless power transmitter apparatus of claim 34, wherein the adjusting means comprises a controller circuit.

52. The wireless power transmitter apparatus of claim 34, wherein the third frequency is one of a fundamental frequency, a harmonic frequency, a sideband frequency, or a guard band frequency of the first frequency.

* * * * *